United States Patent [19]
Griffey

[11] 3,925,716
[45] Dec. 9, 1975

[54] STABLE POWER SUPPLY

[75] Inventor: Donald E. Griffey, Skokie, Ill.

[73] Assignee: Quasar Electronics Corporation, Franklin Park, Ill.

[22] Filed: June 27, 1974

[21] Appl. No.: 483,693

[52] U.S. Cl. .................... 321/2; 307/265; 315/389; 321/18; 323/17; 323/22 T; 328/58

[51] Int. Cl.[2] ........................................ H02M 3/335

[58] Field of Search ...... 307/265, 266, 267; 328/58; 315/379, 387, 389, 411, 277 D, 403; 321/2, 14, 18, 37; 323/22 T, 17, DIG. 1

[56] References Cited

UNITED STATES PATENTS

| | | | |
|---|---|---|---|
| 3,077,550 | 2/1963 | Macovski | 315/379 |
| 3,767,960 | 10/1973 | Ahrens | 315/27 TD |
| 3,793,553 | 2/1974 | Sexton, Jr. et al. | 315/389 |
| 3,803,517 | 4/1974 | Bellocchio | 321/2 |
| 3,859,590 | 1/1975 | Cielo et al. | 307/265 X |

OTHER PUBLICATIONS

"Motorola Electronic Power Supply for Quasar Color T.V.", CTV 7/8-72; pp. 1-10.

*Primary Examiner*—Gerald Goldberg
*Attorney, Agent, or Firm*—LaValle D. Ptak

[57] ABSTRACT

A system for producing stable direct current voltages from the horizontal output transformer of a television receiver includes an oscillator operating at the horizontal frequency to supply drive signals through a wave shaping circuit to a switching amplifier. The duty cycle of the switching amplifier is controlled by the wave shaping circuit which in turn is controlled by the voltage from a half-wave recitifier coupled with the output of the switching amplifier. The operation varies the duty cycle of the output signals from the switching amplifier in such a way as to stabilize the rectified direct current voltage.

15 Claims, 1 Drawing Figure

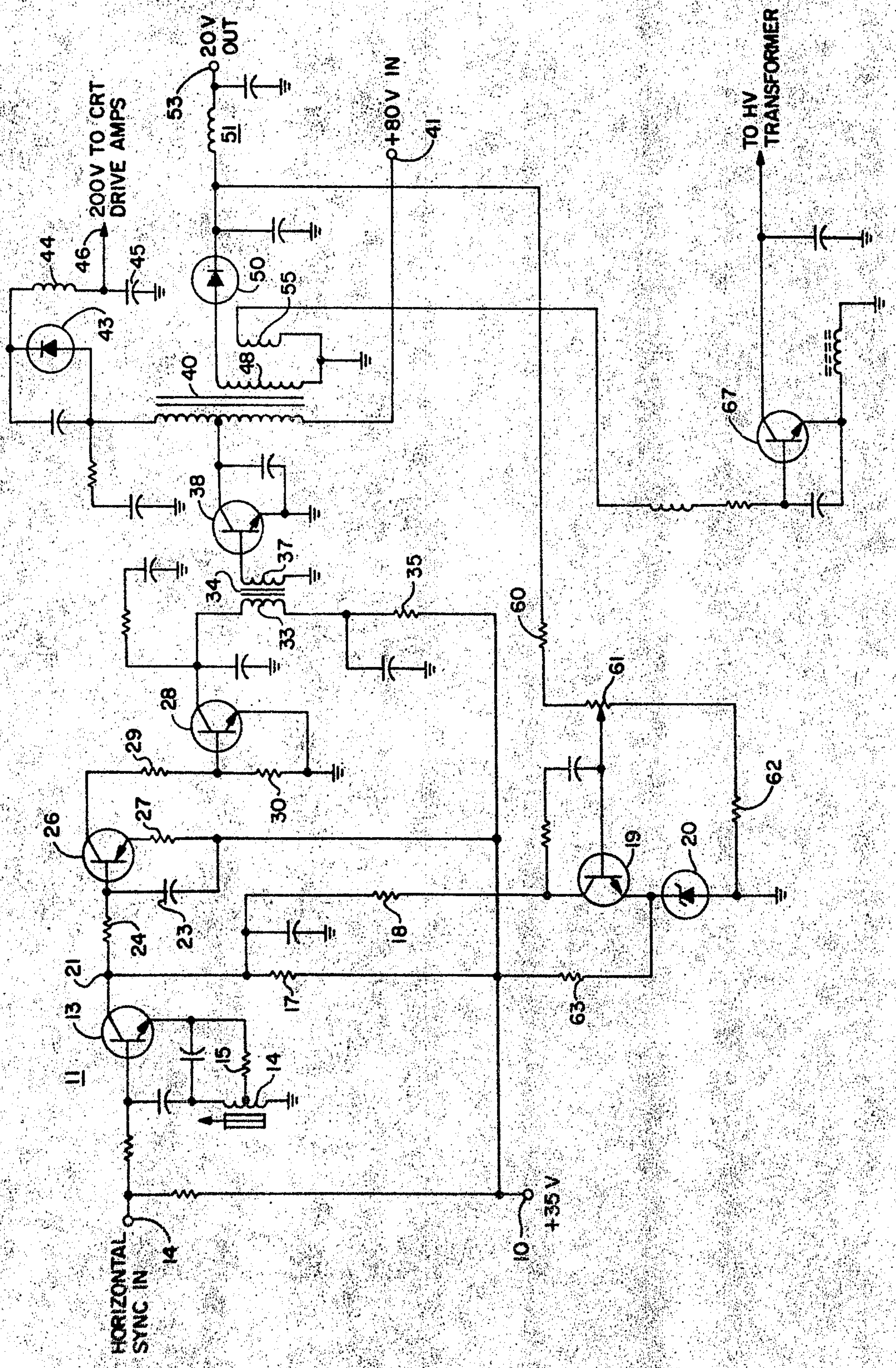
20V OUT
+80V IN
200V TO CRT DRIVE AMPS
TO HV TRANSFORMER
HORIZONTAL SYNC IN
+35 V

STABLE POWER SUPPLY

BACKGROUND OF THE INVENTION

There is a need in a large number of applications, such as a television receiver, to produce a number of stabilized output DC (direct current) voltages from a common power supply. The production of the various DC voltages for a television receiver generally is accomplished in a separate regulated power supply section of the receiver. Generally, such a section produces all of the various different direct current voltages used in the receiver which results in either a very large, costly transformer or other relatively complex power supply and regulating circuitry.

Regulation of the direct current voltages also is accomplished in various ways, such as by shunt regulators and the like; and some applications utilize a chopped DC supply with variations of the duty cycle of the chopper circuit to achieve the desired regulation. While such systems have been found generally to operate satisfactorily, they require additional transformer windings and a number of other components added to the power supply specifically for the purpose of achieving the desired regulation. This naturally increases the cost of the power supply.

It is desirable to achieve regulation of the DC power supply for at least a portion of the voltages used in a television receiver with a minimum number of additional components, so that the regulation can be accomplished at a minimum cost.

SUMMARY OF THE INVENTION

Accordingly, it is an object of this invention to provide an improved stabilized or regulated power supply.

It is another object of this invention to provide an improved stabilized or regulated direct current power supply for a television receiver.

It is an additional object of this invention to provide an improved direct current regulated power supply using a minimum number of components.

It is a further object of this invention to provide an improved regulated direct current powe. supply for a television receiver in which the regulated voltages are obtained from the output of the horizontal oscillator.

In accordance with a preferred embodiment of this invention, a system for producing a stabilized or regulated direct current voltage includes an oscillator, which may be the horizontal oscillator of a television receiver, having a switching device connected between a first circuit junction and a point of reference potential. The switching device is rendered alternately conductive and nonconductive at a predetermined frequency. The circuit junction is a point on a voltage divider which comprises a resistor coupled between a source of direct current potential and the junction and a second voltage variable resistor connected in circuit between the junction and the point of reference potential.

A wave shaping circuit also is coupled between the junction and the source of operating potential and produces a triangular waveform, the shape of which is determined by the potentials which appear on the circuit junction as the switching device switches between its nonconductive and conductive states. The potential present on the junction when the switching device is in its nonconductive state varies in accordance with the variations of the resistance of the voltage variable resistor.

A second or output switching circuit is coupled with the wave shaping circuit and is switched between first and second conductive states by the wave shaping circuit; so that the output switching circuit produces a pulsating output signal. This output signal is coupled to at least one half-wave rectifier which produces a rectified DC output voltage from the system. This output voltage is sensed and coupled to the voltage variable resistance to control its resistance in accordance with variations of the output voltage. This control is adjusted to be such that as the output voltage increases, the duty cycle of the output switching circuit is varied by the wave shaping circuit to reduce the output voltage and vice-versa.

BRIEF DESCRIPTION OF THE DRAWING

The sole FIGURE of the drawing is a schematic circuit diagram of a preferred embodiment of the invention as used in a television receiver.

DETAILED DESCRIPTION

Referring now to the drawing, there is shown a direct current voltage supply circuit in accordance with a preferred embodiment of the invention, illustrated as used in conjunction with the horizontal oscillator and horizontal driver section of a television receiver. The principals of the regulation utilized, however, are not limited to the specific circuit application which is illustrated.

Unregulated operating voltage for the circuit shown in the drawing is applied to a first input terminal 10 which has shown applied to it a +35 volt DC (direct current) voltage. This voltage is applied to a relaxation oscillator 11, which may be of any suitable configuration. The oscillator circuit shown is merely used for purposes of illustration. The oscillator 11 includes an output switching transistor 13 which is driven alternately on and off at the frequency of operation of the oscillator, and this frequency can be varied with a variable inductor 14 in the frequency determining portion of the oscillator. In the circuit shown, the oscillator 11 also is synchronized by applying horizontal synchronizing pulses from a terminal 14 to the base of the transistor 13. These pulses are those which are commonly derived in a television receiver from the received composite television signal. It is not necessary, however, for the operation of the regulator circuit disclosed that the oscillator 11 be synchronized to such external synchronizing pulses. The oscillator 11 could be a free running oscillator, and the results accomplished by the circuit would be the same.

The transistor 13 is operated as an on/off switch driven alternately between conduction and nonconduction at the frequency of operation of the oscillator 11. When the transistor 13 is rendered conductive, the potential on its collector goes to near ground since the value of the emitter resistor 15 is relatively low compared to the value of a resistor 17 connecting the collector of the transistor 13 with the voltage supply terminal 10. Conversely, when the transistor 13 becomes nonconductive, the potential on its collector rises to some value established by a voltage divider including the resistor 17, a second resistor 18, an NPN transistor 19 operated as a voltage variable resistor, and a Zener diode 20. These components all are connected between the terminal 10 and ground. As the conductivity of the transistor 19 varies from a more conductive to a less conductive state, the potential or voltage appearing on the collector of the transistor 13 when it is nonconductive varies from a lower potential to a higher potential, respectively.

Initially, for the purposes of description of the operation of the remainder of the circuit, assume that the resistance of the voltage-variable resistor-transistor 19 is fixed at some value. Then as the transistor 13 switches back and forth between its conductive and nonconductive states, the potential or voltage on a junction 21 of the collector of the transistor 13 with the resistor 17 varies from near ground potential to the potential established by the voltage divider 17, 18, 19 and 20.

When the transistor 13 is rendered conductive after being nonconductive, charging current initially flows through a capacitor 23 and a resistor 24 in a wave shaping circuit to commence charging the capacitor 23. When the voltage across the capacitor 23 exceeds the forward emitter-base breakdown voltage of a PNP buffer switching transistor 26, the transistor 26 is switched from a nonconductive state to a conductive state. This occurs relatively soon after the transistor 13 becomes conductive. The maximum charge then attained by the capacitor 23 is established by the voltage drop of an emitter resistor 27 of relatively low value and the forward emitter-base voltage drop of the transistor 26. So long as the transistor 13 remains conductive, this stable state of operation of the system remains, and the resistivity of the variable resistance transistor 19 does not have any affect on the operation of the circuit during this half-cycle of operation of the oscillator 11.

On the next half-cycle of operation of the oscillator 11, when the transistor 13 becomes nonconductive, the voltage on the terminal 21 rises to some value which is less than the full value of the 35 volt potential applied to the terminal 10, as determined by the parameters of the voltage divider 17, 18, 19 and 20. When this occurs, two discharge paths are provided for the capacitor 23. One of these is through the resistor 27 and the emitter-base path of the transistor 26; and so long as the voltage across the capacitor 23 exceeds the forward emitter-base breakdown voltage of the transistor 26 it holds the transistor 26 in its conductive state, even though the transistor 13 is off or nonconductive. This is the purpose of the circuit including the capacitor 23, which in effect operates as a pulse stretcher.

A second discharge path for the capacitor 23 is provided through the resistors 17 and 24. An analysis of this circuit shows that if the voltage divider characteristics of divider 17, 18, 19 and 20 were such that the potential on the terminal 21 were somewhere near ground potential, the transistor 26, of course, would never turn off. In actual practice, however, the voltage at the terminal 21, when the transistor 13 becomes nonconductive, is very near the voltage applied to the terminal 10.

By varying the voltage on the terminal 21, the effect of the discharge path, including the resistors 17 and 24 can be varied; so that the discharge time of the capacitor 23 required to drop the voltage across the capacitor below that necessary to hold the transistor 26 conductive can be varied. For example, assume that the parameters of the voltage divider 17, 18, 19 and 20 are such that when the transistor 13 turns off, the voltage on the terminal 21 is exactly the same as the voltage on the base of the transistor 26 just prior to the turn-off of the transistor 13. In such a situation no current flows through the resistor 24 so that discharge path in effect is blocked or negated. Thus, the only discharge path for the capacitor 23 then is through the resistor 27 and the emitter-base path of the transistor 26. This prolongs the discharge time of the capacitor 23 and, therefore, holds the transistor 26 on or conductive longer than if the discharge path, including the resistors 17 and 24 had been effective.

If the voltage on the terminal 21 is slightly higher than the voltage appearing on the base of the transistor 26 just prior to the time the transistor 13 is turned off, the discharge of the capacitor 23 is accelerated from the example just given. Similarly, if the voltage on the terminal 21 is slightly lower than the voltage on the base of the transistor 26 at the time the transistor 13 is turned off, the discharge time of the capacitor 23 is lengthened slightly over the example given above. This results in variations of the duty cycle of the signals appearing on the collector of the transistor 26, which is coupled to the base of a horizontal NPN driver transistor 28 through a pair of collector resistors 29 and 30. The transistor 28 is rendered conductive and nonconductive when the transistor 26 is conductive and nonconductive respectively.

When the system is used as part of the horizontal drive system of a television receiver, the collector of the transistor 28 is coupled through the primary winding 33 of a coupling transformer 34 and a collector resistor 35 to the B+ supply terminal 10.

An output secondary winding 37 on the transistor 34 is coupled to the base of an NPN driver transistor 38. The polarity of the windings 33 and 37 of the transistor 34 is selected such that the transistor 38 is rendered conductive when the transistor 28 is nonconductive and vice-versa. Thus, when the transistors 26 and 28 become nonconductive upon conduction of the transistor 13, the transistor 38 becomes conductive to draw current through the primary winding of a transformer 40 from an 80 volt direct current source (not shown) coupled to a voltage supply terminal 41.

The alternate conduction and nonconduction of the transistor 38 causes pulsating current to appear in the primary winding 40, and this current is rectified by a first half-wave rectifier diode 43 coupled to a high voltage output of the transformer 40 to supply a 200 volt direct current output voltage through a filter coil 44 and filter capacitor 45 to an output terminal 46. In the example illustrated, this output voltage could be a 200 volt direct current power supply for the drive amplifiers of the cathode-ray tube of a color television receiver. This output voltage, however, also could be used for other purposes in other types of receivers, if desired.

An additional lower voltage secondary winding 48 is coupled through a second half-wave rectifier diode 50, the output of which is filtered by a filter network 51 and applied to an output terminal 53. For the circuit illustrated the output voltage on the terminal 53 is typically 20 volts. This output voltage also is supplied through a voltage divider comprising a resistor 60, a potentiometer 61 and another resistor 62 connected between the cathode of the rectifier diode 50 and ground potential. The tap on the resistor 61 is connected to the base of the variable resistance transistor 19 to supply the control voltage to the transistor 19 which is used to effect the desired regulation.

Assume that for some reason the output voltage supplied by the cathode of the rectifier 50 to the terminal 53 should rise. This could be for any number of causes but that is unimportant. So long as this voltage rises, the voltage detected at the tap of the potentiometer 61 and applied to the base of the transistor 19 also rises. The potential on the emitter of the transistor 19 is fixed by the voltage drop across the Zener diode 20 established by current flowing through a resistor 63 and the Zener diode 20 connected as a voltage divider across the 35 volt source of potential on the terminal 10. Thus, the increased base voltage causes the transistor 19 to be rendered increasingly conductive from the condition it had prior to this voltage rise. This means that the resistance of the transistor 19 drops. The result of this is a dropping in the voltage on the terminal 21 when the transistor 13 is rendered nonconductive. As stated previously, such a drop in voltage on the junction 21 decreases the rate of discharge of the capacitor 23 thereby extending the on time of the transistors 26 and 28. This in turn extends the off time of the duty cycle of the transistor 38 for each cycle of operation of the oscillator 11 and reduces the on time or conduction time of the transistor 38 for each cycle. This means that the half-wave rectifier diodes 43 and 50 are supplied with less energy from the transformer 40, resulting in a reduction of the output voltages on the terminals 46 and 53. This is the desired correction.

The converse is true if for any reason the output voltage on the terminal 53 should drop. When this occurs the the transistor 19 becomes less conductive. This causes the voltage on the junction 21 to be higher when the transistor 13 is rendered nonconductive. Such a condition, as stated previously, increases the discharge rate of the capacitor 23 to shorten the on time of the transistors 26 and 28 for each cycle of operation of the oscillator 11. This shortens the on portion of the duty cycle of the transistors 26 and 28 resulting in a lengthening of the on portion of the duty cycle of the transistor 38. As a consequence, the half-wave rectifiers 43 and 50 are supplied with energy for a greater portion of each cycle of operation of the oscillator 11, causing an increase in the output voltages appearing on the terminals 46 and 53. Once again, the desired correction is effected.

It should be noted that the sensing of the voltage which controls the conductivity or resistivity of the transistor 19 is from the output of the rectifier diode 50 only. This sensing also could be effected from the output of the rectifier 43, but it is not necessary to sense the output of both of these rectifiers since the voltages on the terminals 46 and 53 undergo variations in the same way in response to operation of the system. It is necessary only to detect the output voltage on one or the other of these terminals, and the output on the 20 volt terminal 53 has been found to be most convenient.

Another output winding 55 is illustrated in the drawing and is shown coupled to the base of an NPN horizontal output transistor 67, the collector of which may be coupled to the high voltage transformer of a television receiver in a manner well known in the art. The operation of the transistor 67 and the high voltage transformer to which it is connected, however, do not form a part of the control circuit described.

In a circuit which has actually been commercially operated, the following values were used for some of the components which are shhown in the drawing:

| COMPONENTS | VALUES |
|---|---|
| Resistor 17 | 560 ohms |

-continued

| COMPONENTS | VALUES |
|---|---|
| Resistor 18 | 10 kilohms |
| Resistor 24 | 10 kilohms |
| Resistor 15 | 150 ohms |
| Capacitor 23 | .001 farad |
| Resistor 60 | 6.8 kilohms |
| Potentiometer 61 | 2.5 kilohms |
| Resistor 62 | 3.3 kilohms |

These values are shown for purposes of illustration only and in no way are to be considered as limiting values for these components. It also will be noted that various capacitors which have not been given reference numbers are shown connected across a number of components in the circuit. These capacitors are for the purpose of shunting high frequency noise which is frequently encountered in television receivers; and if the system is not used in a television receiver, many of these capacitors could be eliminated. The functional operation of the circuit which has been described, however, is not affected by these capacitors which are included for purposes other than the operation of the basic regulated supply circuit which has been disclosed.

This circuit requires the addition of a minimum number of components to a television receiver circuit to achieve a substantial regulation. The additional components comprise the transistor 19, the Zener diode 20, the resistors 60, 62 and 63 and the potentiometer 61. These few components, operating to vary the duty cycle of the horizontal drive transistors in a television receiver, result in extremely stable direct current output voltages on the terminals 46 and 53.

I claim:

1. A system for producing a regulated direct current (DC) voltage including in combination:

first circuit means for producing a substantially square wave output at a predetermined frequency and varying between first and second voltage levels on alternate half-cycles thereof;

switch means coupled with the output of said first circuit means for switching between first and second states in response to said first and second voltage levels, respectively, said switch means including means for delaying switching from said second to said first state thereof for a time interval after said first circuit means output attains said first voltage levels following said second voltage levels, said time interval being proportional to the relative magnitudes of said first and second voltage levels;

half-wave rectifier means coupled with said switch means for producing a rectified output voltage, the magnitude of which is proportional to the duration of time said switch means is in one of said first and second states; and sensing means coupled with said half-wave rectifier means for sensing said rectified output voltage and coupled with said first circuit means for varying said relative magnitudes of said first and second voltage levels.

2. The combination according to claim 1 wherein said second voltage level is a substantially fixed voltage level and said sensing means varies said first voltage level.

3. The combination according to claim 2 further including a voltage divider and first and second voltage supply terminals, said second terminal coupled with a source for supplying voltage at said second voltage level and said first terminal coupled with a different voltage level; and wherein said first circuit means includes an on/off switching device coupled between said second voltage supply terminal and a junction on said voltage divider with said divider coupled between said first and second voltage supply terminals for establishing said first voltage level on said junction when said switching device is off and wherein said sensing means includes voltage variable resistance means comprising part of said voltage divider.

4. The combination according to claim 3 wherein said voltage divider comprises at least a first resistance means and said voltage variable resistance means coupled together at said junction.

5. The combination according to claim 4 wherein said voltage variable resistance means comprises a transistor, the base of which is coupled with said half-wave rectifier means for sensing a voltage corresponding to the rectified output voltage thereof and the base-emitter path of which is coupled in said series circuit with said first resistance means between said first and second voltage supply terminals.

6. The combination according to claim 5 including a second voltage divider comprising at least a potentiometer coupled between the output of said half-wave rectifier means and said second voltage supply terminal, said potentiometer having a tap coupled with base of said transistor, the collector of said transistor coupled with said junction, and the emitter of said transistor coupled with said second supply terminal.

7. The combination according to claim 6 further including Zener diode means coupling the emitter of said transistor with said second supply terminal.

8. A system for producing a regulated direct current (DC) voltage including in combination:

first and second voltage supply terminals;

a first switching device coupled in circuit between a first circuit junction and said second voltage supply terminal and rendered alternately conductive and nonconductive at a predetermined frequency;

a first voltage divider comprising first resistance means coupled between said first voltage supply terminal and said first circuit junction and second voltage variable resistance means coupled between said first junction and said second voltage supply terminal, the voltage of said first junction when said first switching device is nonconductive being dependent upon the value of said voltage variable resistance means;

wave shaping means coupled between said first voltage supply terminal and said first junction for producing a triangular waveform, the shape of which is determined by the potentials appearing on said first junction as said first switching device switches between non-conductive and conductive states;

second switching means coupled with said wave shaping means and switched between first and second conductive states in accordance with the attainment of predetermined voltage levels by said outpupt of said wave shaping means, said second switching means producing a pulsating output signal;

half-wave rectifier means coupled with said second switching means for producing a rectified output voltage; and circuit means coupling the output of said rectifier means with said voltage variable resistance means for controlling the resistance thereof.

9. The combination according to claim 8 wherein said voltage variable resistance means comprises a transistor, the emitter-collector path of which is coupled between said first junction and said second voltage supply terminal and the base of which is coupled with the output of said rectifier means.

10. The combination according to claim 9 further including a second voltage divider coupled between the output of said rectifier means and said second supply terminal, with the base of said transistor coupled with said second voltage divider.

11. The combination according to claim 10 wherein said second voltage divider includes a potentiometer having a tap coupled with the base of said transistor.

12. The combination according to claim 11 further including a Zener diode coupled between the emitter of said transistor and said second voltage supply terminal, the collector of said transistor being coupled with said first junction.

13. The combination according to claim 12 wherein said first voltage supply terminal is coupled with a source of positive potential, said second voltage supply terminal is coupled with ground potential, and said transistor is an NPN transistor.

14. The combination according to claim 13 wherein said wave shaping means includes a capacitor and a resistor coupled together at a second junction and connected in series in the order named between said first voltage supply terminal and said first junction, said second junction comprising the output of said wave shaper means coupled with said second switching means.

15. The combination according to claim 14 wherein said second switching means comprises at least one switching transistor, the base of which is coupled with said second junction, and the collector-emitter path of which is coupled in series circuit between said first and second voltage supply terminals, with an output circuit coupling one of the collector or emitter electrodes of said switching transistor with said half-wave rectifier means.

* * * * *